US000001008H

United States Statutory Invention Registration [19]

[11] Reg. Number: H1008

Schadow et al.

[43] Published: Jan. 7, 1992

[54] DUMP COMBUSTOR WITH NONCOHERENT FLOW

[75] Inventors: Klaus C. Schadow, Ridgecrest, Calif.; Ephraim Gutmark, Ra'anna, Israel; James E. Crump; Kenneth J. Wilson, both of Ridgecrest, Calif.

[73] Assignee: The United States of America as represented by the Secretary of the Navy, Washington, D.C.

[21] Appl. No.: 737,763

[22] Filed: May 28, 1985

[51] Int. Cl.[5] ..... F02K 7/08

[52] U.S. Cl. ..... 60/737; 60/270.1

*Primary Examiner*—Donald P. Walsh

*Attorney, Agent, or Firm*—Robert F. Beers; W. Thom Skeer; Stephen J. Church

[57] ABSTRACT

In a combustor in which a flow area for fuel and air increases suddenly at a dump so as to generate vortices which mix the fuel and air for combustion downstream of the dump, the improvement in which the flow cross section upstream of the dump is noncircular, as triangular or rectangular, causing flow downstream of the dump to be noncoherent so that mixing by the vortices is aperiodic with the result that heat release on mixing is uniform in time and does not drive oscillations in the combustor.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DUMP COMBUSTOR WITH NONCOHERENT FLOW

BACKGROUND OF THE INVENTION

1. Field of the Invention

This invention pertains to the field of reaction motors in which air is supplied by ram effect and in which a mixture of fuel and oxidizer is injected into the reaction zone.

2. Description of the Prior Art

In a well known dump combustor, as used for example in a ramjet, fuel and air mixed insufficiently for combustion flow through a duct having a relatively small cross section upstream of a "dump" at which the flow cross section increases substantially instantaneously generating vortices which thoroughly mix the fuel and air for combustion downstream of the dump. In prior art combustors of this type the cross section upstream of the dump, insofar as is known, is substantially circular resulting in coherent flow downstream of the dump so that such vortices are uniform circumferentially of flow issuing from the smaller diameter section. These vortices, being uniform, form and break away at uniform intervals so that heat release upon mixing by the vortices is periodic with resulting pressure oscillations in the combustor. If these oscillations resonate with other accoustic oscillation natural to the combustor, very high amplitude oscillations result with damage to the combustor, an engine employing it, or the structure of a vehicle provided with the engine. Such high amplitude oscillations may, in any event, perturb a guidance system of the vehicle or expel a desired shock from the inlet of such an engine causing an unstart thereof. As a result the advantages of such a prior art dump combustor, such as simplicity in construction and efficient combustion, are often not practically useable.

SUMMARY OF THE INVENTION

A dump combustor in which, the flow area immediately upstream of the dump is substantially noncircular so that vortices induced by the dump are aperiodic and flow downstream thereof is noncoherent so that fuel/air mixing and the resulting combustion and heat release are substantially uniform in time and do not drive accoustic oscillations.

It is an object of the subject invention to provide a dump combustor having a configuration which does not result in periodic fluctuation in heat release in the combustor.

A further object is to provide a dump combustor which has the foregoing advantage, is simple in construction, and provides efficient combustion.

BRIEF DESCRIPTION OF THE DRAWING

Other objects and advantages of the subject invention be apparent from the following detailed description of the invention when considered with the accompanying drawing in which.

DETAILED DESCRIPTION OF THE PRIOR ART AND OF THE PREFERRED EMBODIMENTS

Figure 1:
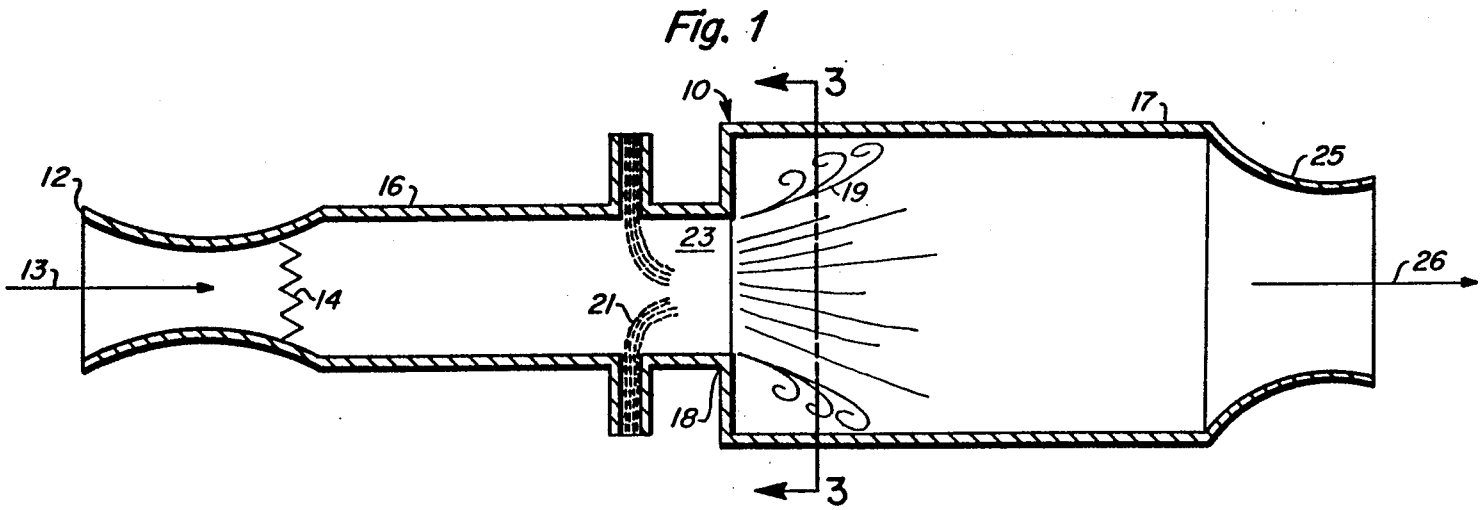
FIG. 1 is a longitudinal section of a ramjet engine having a dump combustor.

FIG. 1 schematically depicts an exemplary ramjet engine having a representative dump combustor 10 The engine has an inlet 12 for compressing supersonic airflow indicated by arrows 13, a substantial part of the compression occurring in the inlet at a shock 14. The compressed air flows through a duct 16 to downstream portion 17, of combustor 10, portion 17 having a substantially larger cross sectional flow area than duct 16. The transition or "dump" 18 between duct 16 and combustor portion 17 is abrupt, so as to induce vortices, indicated in FIG. 1 by the numeral 19, in the shear layer between fluid in combustor portion 17 and fluid entering this portion from duct 16. Fuel, typically liquid, is injected as indicated by numeral 21 at a point somewhat upstream of dump 18. However, the air velocity and conditions of injection are such the air and fuel are not mixed effectively enough for combustion in duct 16, although the region of duct 16 between the fuel injection indicated by numeral 21 and dump 18 may be considered as an upstream portion 23 of combustor 10 contiguous with downstream portion 17 thereof. However, immediately downstream of dump 18 the air and fuel are mixed sufficiently for combustion, the combustion occurring in the shear layer which contains vortices 19 during mixing thereby so that combustion is, in effect, retained in downstream portion 17. After combustion the products thereof exhaust through a nozzle 25 as indicated by arrows 26.

It should be noted that, in a dump combustor suited for practice of the subject invention, there may be a plurality of inlet ducts corresponding to duct 16 entering an enlarged combustor portion corresponding to portion 17, that an inlet duct need not be coaxially related to such an enlarged portion, and that the direction of flow into such an enlarged portion need not be in the direction of other flow therein nor in the direction of flow from a nozzle corresponding to nozzle 25.

Figure 2:
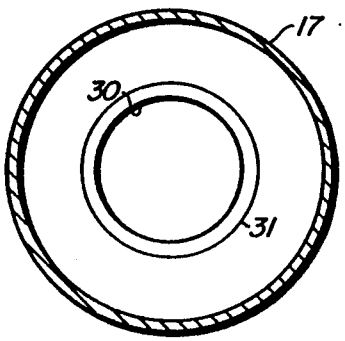
FIG. 2 is a view taken from the position of line 2—2 of FIG. 1 showing a circular flow area used with such a dump combustor of the prior art.

In prior art dump combustors configured and functioning similarly to combustor 10, the upstream portion 23, insofar as known to the applicants, has, at dump 18, a substantially circular cross section, as indicated in FIG. 2 by numeral 30. As a result, vortices 31 corresponding to vortices 19 in FIG. 2 are uniform circumferentially of fluid entering enlarged portion 17 causing the oscillations and resulting previously described problems.

Figure 3B:
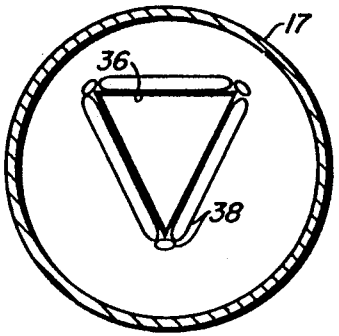
FIGS. 3A and 3B are views similar to FIG. 2 showing, respectively, a triangular flow area and a rectangular flow area utilized in such a combustor embodying the subject invention.
Figure 3A:
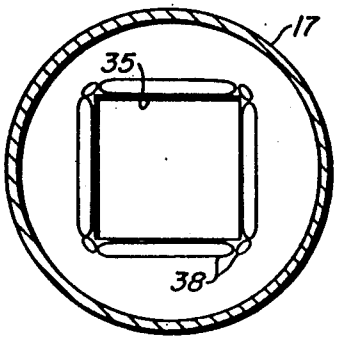

However, in the practice of the subject invention the upstream portion 23 has, at dump 18, a substantially noncircular cross section such as the rectangular cross section 35 shown in FIG. 3A or the triangular cross section 36 shown in FIG. 3B. As a result, the resulting vortices 38, corresponding to vortices 19 in FIG. 1, are nonuniform in space and in time a in direction circumferentially of fluid entering enlarged portion 17 so that the above described mixing of fuel and air during which combustion occurs does not have periodic fluctuations. The heat release in combustor portion 17 is thus substantially steady and does not drive accoustic oscillations in combustor 10 or other portions of an engine or vehicle having such a combustor. The noncircular cross section may be provided by an orifice at dump 18, with duct 16 being circular, or duct 16 itself may be noncircular in cross section.

Obviously, other modifications and variations of the present invention are possible in light of the above teachings. It is, therefore, to be understood that within the scope of the following claims the invention may be practiced otherwise than as specifically described.

What is claimed is:

1. In a dump combustor having an upstream portion through which effectively unmixed air and fuel flow, having a downstream portion contiguous with said upstream portion and of substantially larger cross sectional flow area than the flow area of said upstream portion, and having an abrupt transition between said flow areas to induce vortices in a shear layer between fluid in said downstream portion and fluid entering said portion from said upstream portion, said vortices mixing the fuel and air immediately downstream of said transition with combustion of the fuel and air occurring during said mixing, the improvement comprising said upstream portion having a cross section which is substantially noncircular at said transition so that said vortices occur nonuniformly in time in a direction circumferentially of said fluid entering said downstream portion and said mixing does not have a periodic fluctuation, with the result that heat release from such combustion is substantially steady and does not drive accoustic oscillations in combustor.

2. The improvement of claim 1 wherein said noncircular cross section is substantially triangular.

3. The improvement of claim 1 wherein said noncircular cross section is substantially rectangular.

* * * * *